April 14, 1970   L. J. KMIECIK ET AL   3,506,028

VALVE ASSEMBLY

Filed Oct. 23, 1967   4 Sheets-Sheet 2

Inventors
Leopold J. Kmiecik
Elwood H. Stonich
By Brown, Jackson, Boettcher & Dienner
Attys.

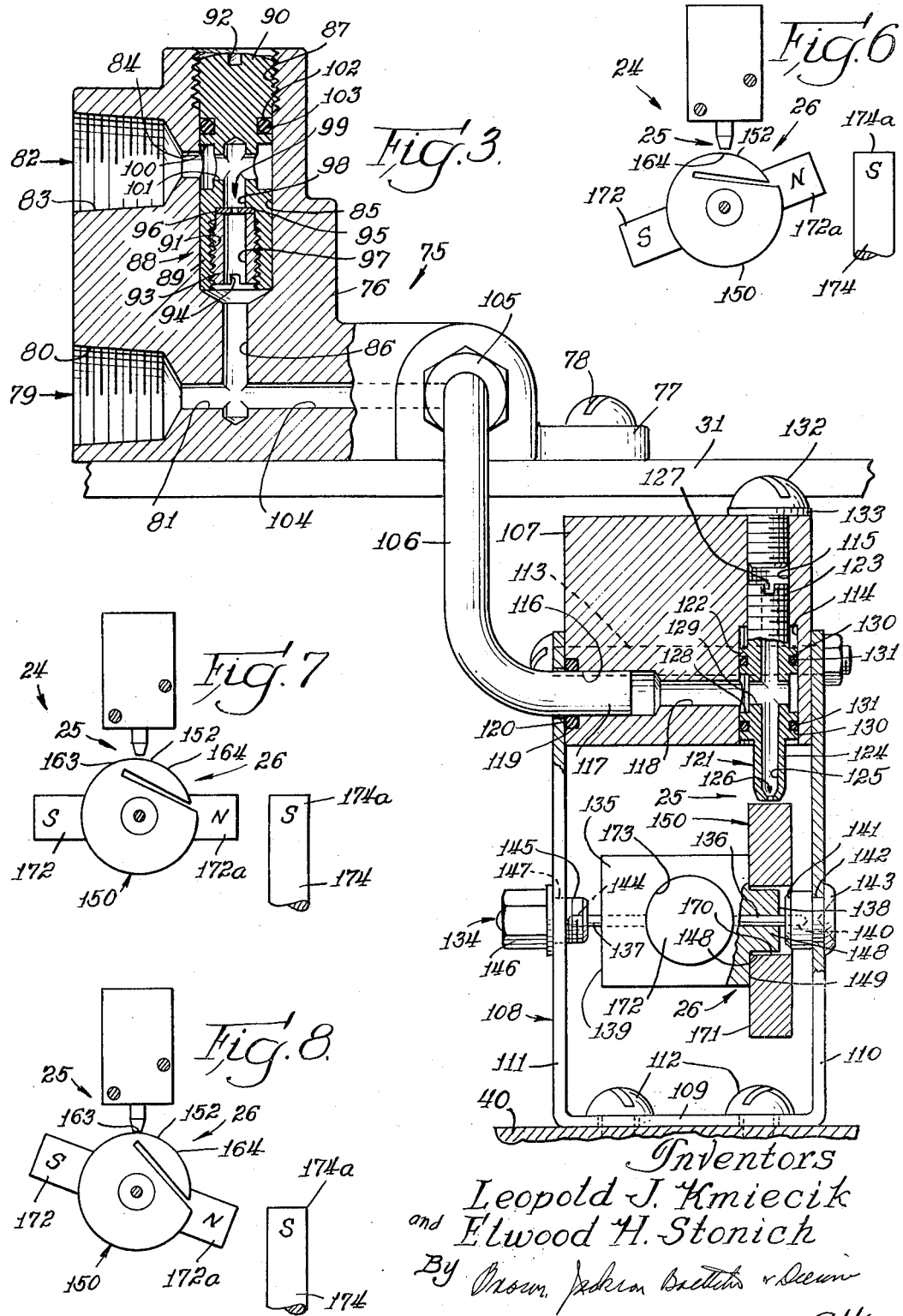

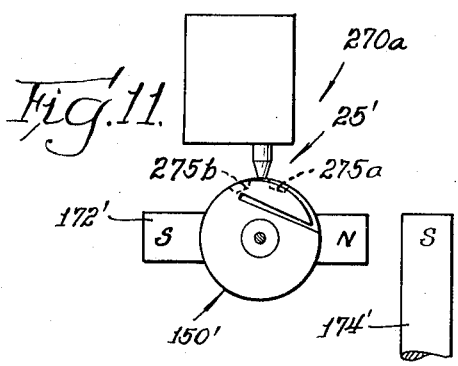
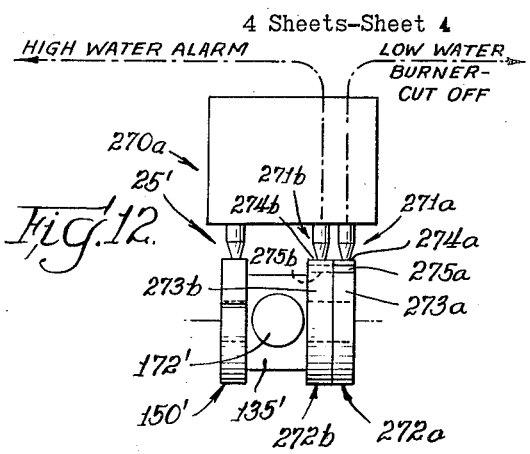
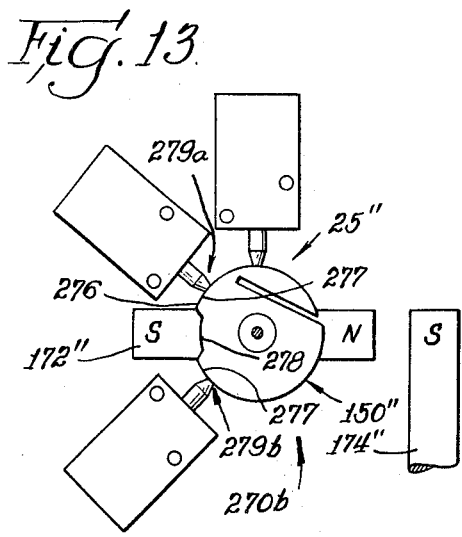
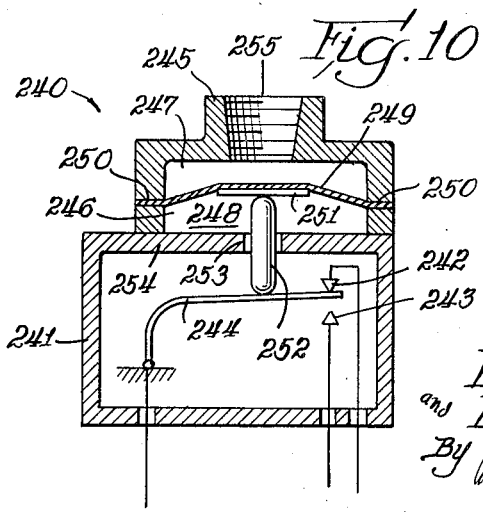
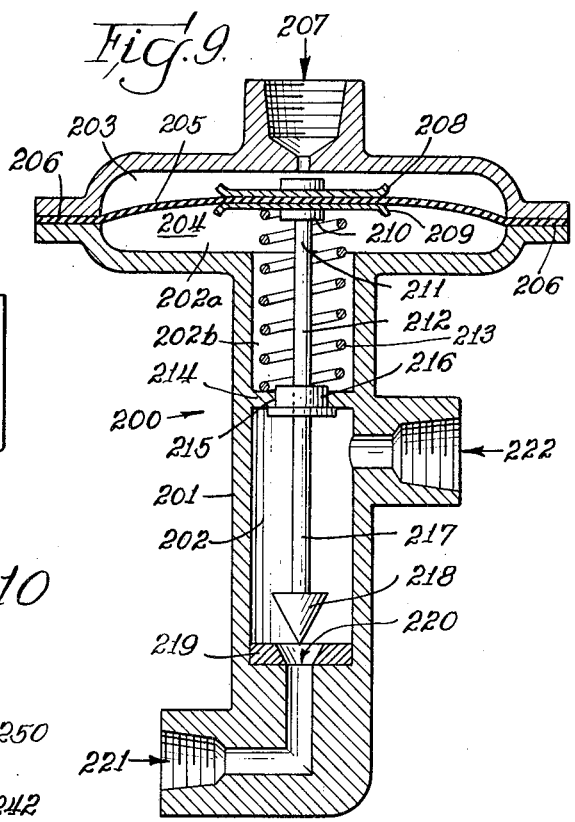

United States Patent Office 3,506,028
Patented Apr. 14, 1970

3,506,028
VALVE ASSEMBLY
Leopold J. Kmiecik, Lincolnwood, and Elwood H. Stonich, Chicago, Ill., assignors to McDonnell & Miller, Inc., Chicago, Ill., a corporation of Delaware
Filed Oct. 23, 1967, Ser. No. 677,314
Int. Cl. F16k 5/04, 31/34
U.S. Cl. 137—412                                        8 Claims

ABSTRACT OF THE DISCLOSURE

A valve assembly comprising port means and rotatable valve or closure means having a peripheral cam-like surface effective for infinitely variably opening and closing the port means upon rotation of the valve means in response to fluid displacement within a fluid-confining vessel such as a float chamber of a boiler.

---

This invention relates to a valve assembly comprising valve means responsive to fluid displacement within a fluid-confining vessel.

In the control system of a boiler or similar apparatus in which a fluid such as water is employed, it often is desirable to utilize a driving fluid such as air under pressure, which is independent of the fluid employed in the boiler or other apparatus, to conduct control signals to a control device from means responsive to fluid displacement within a fluid-confining vessel.

For example, it is conventional to equip a boiler with an auxiliary float chamber by means of which the water level in the boiler may be measured, and it is conventional to insert a proportioning valve in the feedwater system to control the rate of flow of the feedwater into the boiler according to the load on the boiler. Because the water level in the boiler and thus in the float chamber reflects the load on the boiler, it is desirable to control the proportioning valve in the feedwater system in response to changes in the water level in the boiler and thus in the float chamber such that the rate of feedwater inflow will be equal to the rate of water consumption. The manner in which this control may be achieved by utilizing an electrically controlled proportioning valve is disclosed in U.S. Patent No. 3,209,297, issued Sept. 28, 1965 to Kmiecik et al. for a "Level Controlled Switch Mechanism." According to the principles of this invention, this control is achieved by utilizing a fluid-driven proportioning valve.

In the above patent, there is disclosed a combination of magnets which is effective for transmitting the movement of float means to the contact arm of a rheostat in the circuit of an electrically controlled proportioning valve for the feedwater system of a boiler and to additional electrical switch means suitable for the operation of low-water burner cut-off means. The float means is designed to be responsive to water level changes in the float chamber of the boiler. The present invention in several respects is an improvement in and a modification of the subject matter of the above patent. In the preferred embodiment of this invention similar float means and a similar combination of magnets are used to control port means for a driving fluid such as air under pressure, which driving fluid may be employed to control a fluid-driven proportioning valve suitable for the feedwater system of a boiler.

It is one object of this invention to provide a valve assembly comprising port means which may be used to control a fluid-driven proportioning valve in response to fluid displacement in a fluid-confining vessel. The fluid-confining vessel may be a float chamber associated with a boiler, and the fluid-driven proportioning valve may be inserted in the feedwater system of the boiler. Rotatable valve or closure means having a cam-like peripheral surface may be employed to close and open the port means.

It is another object of this invention to provide rotatable valve or closure means for such port means, comprising a rotatable generally disc-shaped member having a radially sloped peripheral cam-like surface effective for closing and opening the port means. The rotatable generally disc-shaped member may be rotated by means responsive to fluid displacement in the fluid-confining vessel.

It is one feature of this invention that the means for rotating the rotatable generally disc-shaped member may comprise float means and a combination of magnets which are similar to the float means and the combination of magnets disclosed in the cited patent.

It is another feature of this invention that electrical switch means which are similar to the additional electrical switch means disclosed in the cited patent may be provided for the operation of low-water burner cut-off means or the like. This is characteristic of the preferred embodiment of this invention.

It is another feature of this invention that, in place of electrical switch means of the above type, additional port means may be provided for the operation of fluid-driven electrical switch means which are associated with low-water burner cut-off means or the like. Rotatable valve or closure means, which comprise rotatable generally disc-shaped members having stepped cam surfaces, may be employed to close and open the additional port means.

These and other objects, features and advantages of this invention will be apparent from the following description.

In order to acquaint those skilled in the art with the manner of constructing and using control systems embodying the principles of this invention, there shall be described, with the aid of the accompanying drawings, a preferred embodiment of this invention and certain possible modifications thereof within the scope of this invention.

In the drawings:
FIGURE 1 is a vertical elevational view of a valve assembly embodying the principles of this invention, portions thereof being broken away and shown in section.

FIGURE 3 is a detail of the fluid passageway means, port means, and rotatable valve or closure means forming part of the valve assembly of FIGURE 1, portions thereof being broken away and shown in section;

FIGURE 6 is a diagrammatic view of a detail of the valve assembly of FIGURE 1 in a widely opened state;

FIGURE 7 is a diagrammatic view, similar to FIGURE 6, of the valve assembly of FIGURE 1 in an intermediately opened state;

FIGURE 8 is a diagrammatic view, similar to FIGURES 6 and 7, of the valve assembly of FIGURE 1 in a fully closed state;

FIGURE 9 is a partly diagrammatic longitudinal sectional view of a fluid-driven, diaphragm-actuated proportioning valve, for use with the valve device of FIGURE 1;

FIGURE 10 is a partly diagrammatic longitudinal sectional view of a fluid-driven, diaphragm-actuated electrical switch, for use with either the modified valve assembly of FIGURES 11 and 12, or the modified valve assembly of FIGURE 11;

FIGURE 11 is a diagrammatic view of a detail of a modified valve assembly;

FIGURE 12 is a diagrammatic view, taken generally from the right side of FIGURE 11; and FIGURE 13 is a diagrammatic view of a detail of another modified valve assembly.

Figure 1:
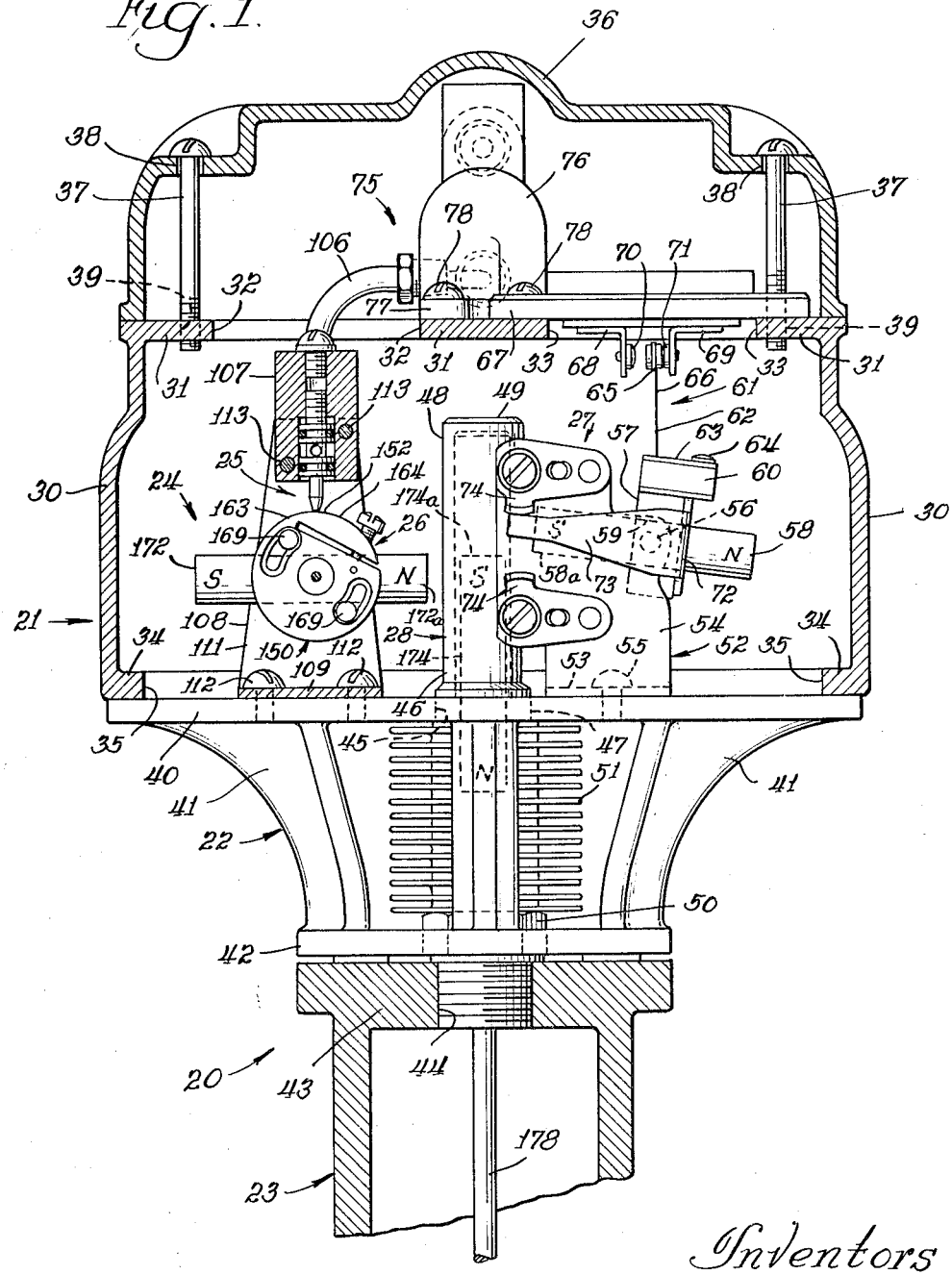
Figure 2:
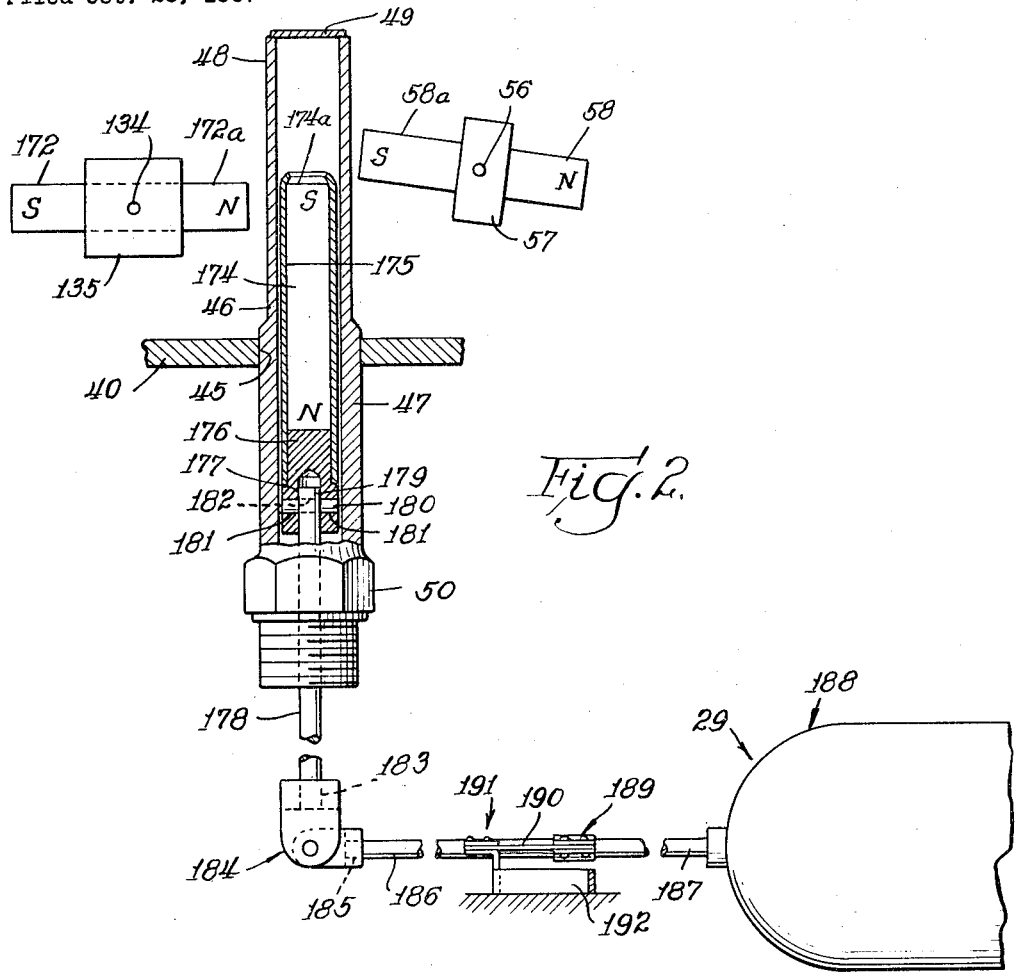
FIGURE 2 is a detail of the combination of magnets and float means forming part of the valve assembly of FIGURE 1, portions thereof being broken away and shown in section.

Considering FIGURES 1 and 2, the valve assembly 20 generally comprises a main housing 21 which is mounted by means of a supporting frame 22 to an upright generally tubular flange 23 of a boiler float chamber (not shown). A valve device 24, which is mounted within the main housing 21 comprises a port means 25 for emitting a driving fluid, preferably air under pressure. Rotatable valve or closure means 26 is provided for closing and opening the port means 25. Electrical switch means 27 is mounted within the main housing 21. The closure means 26 and the electrical switch means 27 are actuated by a combination of magnets 28, which is operated by float means 29 (FIGURE 2) in response to fluid displacement in the boiler float chamber, that is, to water level changes in the boiler float chamber.

The main housing 21 comprises an enclosed side wall 30, which is generally covered by an upper horizontal wall 31 having openings 32 and 33 therein, and which is formed with a lower circumferential flange 34 defining a generally open bottom 35. The upper horizontal wall 31 is integrally mounted in any suitable manner to the side wall 30. An upper cover 36 is removably secured to the upper horizontal wall 31, by means of a plurality of circumferentially spaced machine screws 37, which pass through suitable apertures 38 in the cover 36 and threadably engage suitably threaded apertures 39 in the upper horizontal wall 31. The supporting frame comprises an upper horizontal plate portion 40, a plurality of generally upstanding leg portions 41, and a lower horizontal ring portion 42. The lower circumferential flange 34 is secured to the upper horizontal plate portion 40, in any suitable manner such as by means of machine screws (not shown), in order to mount the main housing 21 to the supporting frame 22. The flange 23 is closed across its top 43 but for a centrally located threaded aperture 44. The horizontal ring portion 42 is secured to the top 43 of the flange 23, in any suitable manner such as by means of machine screws (not shown) in order to mount the supporting frame 22 to the flange 23.

A centrally located opening 45 is provided in the horizontal plate portion 40 of the supporting frame 22. An elongated generally tubular dome member 46, which should be made of a non-magnetic material, has a tubular lower portion 47 closely fitting the opening 45, a tubular upper portion 48 having a closed top 49, and a threaded tubular coupling 50 threadably engaging the threaded aperture 44 in the top 43 of the flange 23. A finned generally cylindrical sleeve 51, which is fitted about the tubular lower portion 47 of the dome member 46, serves to dissipate heat from the boiler float chamber and thus to protect the elements within the main housing 21.

The electrical switch means 27 is similar to the electrical switch means disclosed in the above patent. It comprises a generally U-shaped bracket 52 having a bight portion 53, and a pair of upstanding side portions 54, one of which is illustrated in FIGURE 1. The bight portion 53 is secured to the horizontal plate portion 40 of the supporting frame 22 by means of a plurality of machine screws 55, one of which is illustrated in FIGURE 1. Pivot means 56 pivotally mounts a non-magnetic block 57 between the side portions 54 of the bracket 52. An elongated cylindrical two-pole bar magnet 58 is tightly fitted through a suitable transverse bore 59 in the block 57. Thus, the bar magnet 58, which is generally balanced with respect to the pivot means 56, pivots conjointly with the block 57. The bar magnet 58 is mounted such that one of its poles 58a is near the dome member 46, as will be understood from the drawings. An electrically insulative block 60, which is mounted to the upper side of the housing block 57 in any suitable manner, supports at least one vertically extending contact arm 61. The contact arm 61 comprises an electrically conductive leaf spring member 62, which is bent under and attached at its lower end 63 to the insulative block 60 by means of a screw 64, and a double-headed contact button 65, which is attached to the upper end 66 of the leaf spring member 62. An insulative terminal plate 67, which is positioned upon the upper horizontal wall 31 of the main housing 21 over the opening 33, is secured in place in any suitable manner. A pair of electrically isolated terminal contact means 68 and 69, which are carried by the terminal plate 67, extend downwardly through the opening 33; they include respective contact buttons 70 and 71 which are spaced apart and located on opposite sides of the contact arm 61 to permit selective physical and consequently electrical contact with the contact button 65. A strap member 72, which has a forwardly projecting arm portion 73, and a pair of vertically spaced stop means 74, which are spaced apart and disposed respectively above and below the arm portion 73, are provided to limit the pivotal movement of the bar magnet 58. The strap member 72 is secured in any suitable manner to the block 57. Because the above patent may be consulted for further details which may be useful in understanding the structure and function of the electrical switch means 27, no further description thereof will be given.

As indicated principally in FIGURES 1 and 3, a fluid-diversion system 75 is provided for diverting driving fluid to the port means 25 of the valve device 24. This system 75 comprises a junction housing 76, which is mounted at a lip or flange 77 to the upper horizontal wall 31 of the main housing 21 by means of a pair of machine screws 78. Inlet passageway means 79 comprises a conventional threaded socket 80 and a bore 81, which extends from the socket 80, and outlet passageway means 82 comprises a similar socket 83 and a bore 84, which extends from the socket 83 and which opens laterally into a generally cylindrical well 85. A bore 86 connects the bottom of the cylindrical well 85 to the bore 81. The shallow end 87 of the well 85 is internally threaded.

Means 88 are provided for defining an orifice across the well 85 between the bore 81 and the bore 86. This orifice-defining means 88 has a generally cylindrical core portion 89, which is slip-fitted within the well 85, and a threaded plug portion 90, which threadably engages the threaded shallow end 87 of the well 85. The core portion 89 is provided with an upwardly directed, internally threaded, axial cylindrical well 91. The plug portion has a transverse slot 92, which is adapted to receive a screwdriver blade or similar implement (not shown). A threaded plug member 93, which has a similar transverse slot 94 therein, threadably engages the well 91 to hold a wafer-like orifice plate 95 within the recessed end 96 of the well 91. An axial bore 97 is provided in the plug member 93, and a coaxial bore 98 is provided in the core portion 89 of the orifice-defining means 88. A precisely formed constrictive orifice 99 is formed in the orifice plate 95 to allow fluid to pass from the bore 97 to the bore 98. An annular groove 100, which is somewhat wider than the bore 84, is formed in the core portion 89 of the orifice-defining member 88 so as to communicate with the bore 84. A transverse bore 101, which intersects the bore 98, connects the annular groove 100 at two places to the bore 98, and thus, whether or not the bore 101 is aligned with the bore 84, the bore 101 connects the bore 98 to the outlet passageway means 82. An annular groove 102 is formed in the core portion 89 of the orifice-defining means 88 between the annular groove 100 and the plug portion 90. A conventional resiliently deformable O-ring 103 is seated within this groove 102 to seal the well 85. A bore 104, which is an extension of the bore 81, connects the inlet passageway means 79 to a conventional fitting 105, which connects an outwardly extending length of conventional tubing 106 to the inlet passageway means 79.

The fluid diversion system 75 also comprises a port housing 107, which is mounted to the horizontal plate portion 40 of the supporting frame 22 by means of a generally U-shaped bracket 108 having a bight portion 109 and a pair of upstanding portions 110 and 111. The bight portion 109 of the bracket 108 is secured to the horizontal plate portion 40 of the supporting frame 22 by means of a plurality of machine screws 112. The port housing 107 is mounted between the side portions 110 and 111 by means of a pair of machine bolts 113.

A downwardly opening vertical well 114 is provided in the port housing 107, and a threaded bore 115, which is coaxial therewith, extends from the well 114 to the outside of the port housing 107. A laterally opening socket 116 is provided in the port housing 107, and the extended end 117 of the tubing 106 is inserted therein. A bore 118, which laterally intersects the well 114, connects the socket 116 and the tubing 106 to the well 114. An annular counterbore 119 is provided around the socket 116, and a conventional resiliently deformable O-ring 120 is pressed into this counterbore 119 around the tubing 106 to seal the socket 116.

The port means 25 of the valve device 24 comprises a core member 121. The core member 121 has a body portion 122, which is slip-fitted within the well 114, a threaded end portion 123, which threadably engages the threaded bore 115, and a downwardly extending nozzle portion 124, which extends beneath the port housing 107. An axial bore 125, which is provided in the core member 121, is tapered at the nozzle portion 124 to a precisely formed constrictive orifice 126, which is larger than the orifice 99. The threaded end portion 123 has a transverse slot 127, which is adapted to receive a screwdriver blade or similar implement (not shown). An annular groove 128, which is somewhat wider than the bore 118, is formed in the body portion 122 of the core member 121 so as to communicate with the bore 118. A transverse bore 129, which intersects the bore 125, connects the annular groove 128 at two places to the bore 125 and thus, whether or not the bore 129 is aligned with the bore 118, connects the tubing 106 to the nozzle portion 124 of the core member 121. A pair of annular grooves 130 are formed in the body portion 122 of the core member 121 on opposite sides of the annular groove 128. Respective conventional resiliently deformable O-rings 131 are seated within these grooves 130 to seal the port means 25. The threaded opening 115 is closed by a machine screw 132, which is employed over a sealing washer 133.

Because the orifice 126 of the port means 25 is larger than the orifice 99 of the junction housing 76, the port means 25 may be used to divert most of the entering driving fluid from the inlet passageway means 79 and to bleed the outlet passageway means 82.

Pivot means 134 is provided for pivotally mounting a non-magnetic housing block 135 between the side portions 110 and 111 of the bracket 108 and beneath the port housing 107. The pivot means 134 comprises a first pin 136 and a second pin 137, which are integrally mounted to and extended from respective opposite sides 138 and 139 of the housing block 135. A bearing socket 140, which is adapted to receive the first pin 136 for pivotal rotation of the housing block 135, is formed in the head of a stud 141, which passes through an opening 142 in one side portion 110 of the bracket 108. The emerging end 143 of the stud 141 is hollowed such that portions of this end 143 may be pressed, in any suitable manner, against the side portion 110 of the bracket 108 to lock the stud 141 in place. A bearing socket 144, which is adapted to receive the second pin 137 for pivotal rotation of the housing block 135 is formed in the inserted end 145 of a threaded stud 146, which threadably engages a threaded aperture 147 in the other side portion 111 of the bracket 108.

The first pin 136 is integrally mounted to and extended from the center of a cylindrical boss 148 which is an integral part of the housing block 135. The boss 148 extends from a generally flat shoulder 149 upon which the closure means 26 of the valve 24 is mounted.

Figure 4:
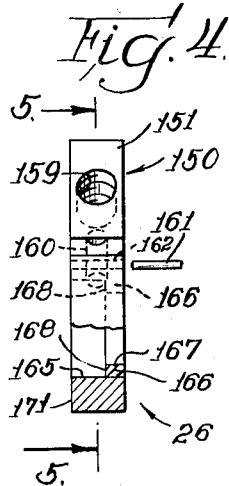
FIGURE 4 is a detail of the rotatable generally disc-shaped member forming part of the valve assembly of FIGURE 1, a component pin being shown in exploded relationship therewith, portions thereof being broken away and shown in section.
Figure 5:
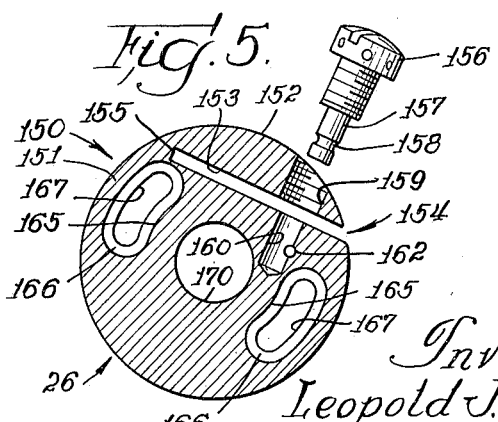
FIGURE 5 is a sectional view, taken substantially along section line 5—5 of FIGURE 4, looking in the direction indicated by the arrows, a component stud means being shown in exploded relationship with the cam member.

As indicated principally in FIGURES 4 and 5, the closure means 26 of the valve device 24, which is effective for closing and opening the port means 25 of the valve means 24, comprises a rotatable generally disc-shaped member 150 which includes a generally disc-shaped body 151 having a peripheral cam-like surface 152. The cam-like surface 152 may be formed by drawing together portions of the body 151 of the cam member 150 on opposite sides of a chordal slot 153, which opens (at 154) at the periphery of the body 151 and terminates (at 155) in the body 151. These drawn together portions of the body 151 are held together by means of a threaded stud 156, which has an unthreaded elongated lead portion 157 having an annular groove 158 formed thereon. To cooperated with the stud 156, a threaded receptacle 159 is formed in the body 151 radially outwardly of the slot 153, and a socket 160, which is generally aligned with the receptacle 159, is formed in the body 151 radially inwardly of the slot 153. The stud 156 threadably engages the threaded receptacle 159 such that the lead portion 157 thereof is inserted into the socket 160, which is slightly oversize with respect to the lead portion 157 of the stud 156 so as to permit the lead portion 157 to enter the socket 160 before the portions of the body 157 are drawn together and to move within the socket 160 as the portions of the body 151 are drawn together. The lead portion 157 of the stud 156 is held in place, so as to hold together these portions of the body 151, by means of a laterally inserted retaining pin 161 fitting within a lateral bore 162, which at least partly intersects the socket 160. The retaining pin 161 engages the annular groove 158 on the lead portion 157 of the stud 156 to lock the stud 156 in place. A limited adjustment of the curvature of the peripheral cam-like surface 152 may be effected by turning the stud 156 after it has been locked in place as described.

As indicated in FIGURE 1, the cam-like surface 152 has a radially high portion 163 (indicated generally), which is effective for closing the port means 25 of the valve device 24 and a radially reduced portion 164 (indicated generally), which is effective for variably opening the port means 25 of the valve device 24. Beginning at the radially high portion 163 and continuing therefrom, the radially reduced portion 164 is gradually reduced in radial height.

In order that the generally disc-shaped member 150 may be correctly positioned with respect to the port means 25, the body 151 thereof is adjustably mounted to the housing block 135. To this end, as indicated in FIGURES 4 and 5, the body 151 is provided with a diametrically opposite pair of similar round-ended generally arcuate slots 165, into which are force-fitted respective similarly shaped mechanical bushings 166 having smaller similarly shaped slots 167 provided therein. These bushings 166 form shoulders 168 which are adapted to receive respective machine screws 169 (FIGURE 1). The body 151 of the generally disc-shaped member 150 also is provided with an enlarged central opening 170, which is adapted to admit the cylindrical boss 148 of the housing block 135 (FIGURE 3). The shoulder 149 of the housing block 135 is provided with threaded apertures (not shown) which are threadably engaged by the machine screws 169 to mount the generally disc-shaped member 150 with one flat side 171 thereof being flat against the shoulder 149 (FIGURE 3). The port housing 107 and the housing block 135 are arranged such that the generally disc-shaped member 150 may be correctly positioned with respect to the port means 25 by adjusting of the position of the slots 167 with respect to the apertures prior to tightening of the screws 169.

A second elongated cylindrical two-pole bar magnet 172 which is tightly fitted through a suitable transverse bore 173 in the housing block 135 is transversely mounted for conjoint rotation with the generally disc-shaped member 150. The bore 173 is located in such position that the bar magnet 172 may be generally balanced with respect to the pivot means 134. The bar magnet 172 is mounted such that one of its poles 172a is near the dome member 46, as will be understood from the drawings.

The position of the generally disc-shaped member 150 with respect to the port means 25 should be adjusted, in the manner described, such that the port means 25 is in a widely opened state when the bar magnet 172 is pivoted from a level position in one pivotal sense (FIGURE 6), such that the port means 25 is in a baffled or intermediately opened states when the bar magnet 172 is in a level position (FIGURE 7), and such that the port means 25 is fully closed when the bar magnet 172 is pivoted from a level position in the opposite pivotal sense (FIGURE 8).

As indicated principally in FIGURE 2, the float mechanism 29 comprises an elongated cylindrical two-pole bar magnet 174, which is slidably mounted for axial movement within the dome member 46 so as to effect actuation of the electrical switch means 27 and the valve device 24. To this end, the bar magnet 58 of the electrical switch means 27 is mounted with its nearer pole 58a being of a polarity similar to the polarity of the upper pole 174a of the bar magnet 174 of the float mechanism 29, and the bar magnet 172 of the closure means 26 of the valve 24 is mounted with its nearer pole 172a being of the opposite polarity as the upper pole 174a of the bar magnet 174 of the float mechanism 29. As shown, the upper pole 174a of the bar magnet 174 is South (S). According to the stated principle, the nearer pole 58a of the bar magnet 58 is South (S) and the nearer pole 172a of the bar magnet 172 is North (N). Thus, incremental up and down axial movements of the bar magnet 174 of the float mechanism 29 effects incremental pivotal movements of the bar magnets 58 and 172. In this manner, the generally disc-shaped member 150 of the closure means 26 may be rotated so as to close and variably open the port means 25 of the valve device 24, as described. Also, when the upper pole of the bar magnet 174 is beneath the nearer pole of the bar magnet 58, the nearer pole 58a of the bar magnet is repelled and thus the contact arm 61 is biased so as to place the contact button 65 into physical and consequently electrical contact with the contact button 71. When the upper pole 174a of the bar magnet 174 is above the nearer pole 58a of the bar magnet 58, the nearer pole 58a of the bar magnet 58 is repelled and the contact arm 61 is biased so as to place the contact button 65 into physical and consequently electrical contact with the contact button 70. When the upper pole 174a of the bar magnet 174 is moved either from beneath to above or from above to beneath the nearer pole 58a of the bar magnet 58, the pivotal movement of the bar magnet 58 effects a corresponding snap action of the contact arm 61, in accordance with the bias imposed by the upper pole 174a of the bar magnet 174 upon the near pole 58a of the bar magnet 58.

The bar magnet 174 is encased by a non-magnetic sleeve 175 which slidably fits within the dome member 46. The bar magnet 174 is connected by the sleeve 175 to a plug member 176, which has an axial socket 177. A generally vertical actuating rod 178 is received at its upper end 179 by the socket 177 and is held in place by a transverse retaining pin 180, which extends through transverse slots 181 in the plug member 176 and through a transverse slot 182 in the actuating rod 178. The actuating rod 178 extends through the threaded tubular coupling 50 of the dome member 46 and thus through the flange 23 of the boiler float chamber. The lower end 183 of the actuating rod 178 is connected by conventional pivot means 184 to one end 185 of a lever rod 186, which is contained within the boiler float chamber. The other end 187 of the lever rod 186 is secured, in any suitable manner, to a conventional float member 188, which is contained within the boiler float chamber. The lever rod 186 is intermediately connected (at 189) to a leaf spring means 190, which in turn is connected (at 191) to a stationary bracket 192. The leaf spring means 190 provides a rocking fulcrum for the lever rod 186 and allows the float member 188 to impart a limited axial movement to the bar magnet 174 such as will actuate the valve means 24 and the electrical switch means 27 in response to fluid displacement within the boiler float chamber. For further details of the manner in which the lever rod 186 is mounted, reference may be had to U.S. Patent No. 2,770,695, issued Nov. 13, 1956 to Kmiecik for a "Boiler Control Mechanism."

The actuating rod 178, the lever rod 186, and the stationary bracket 192 may be arranged to place the valve device 24 in a baffled or intermediately opened state (FIGURE 7) which reflects the mean water level in the boiler float chamber, that is, the water level under normal operation of the boiler (not shown). The fully opened state of the port means 25 (FIGURE 6) thus may correspond to a low-water condition in the boiler, and the fully closed state of the port means 25 (FIGURE 8) thus may correspond to a high-water condition in the boiler. The amount of opening of the port means 25 is infinitely variable between the fully opened and fully closed states of the port means 25 (FIGURES 6 and 8). This permits the use of a proportioning valve of the type which is illustrated in FIGURE 9. Also, it permits the electrical switch means 27 to be connected in the circuits of a low-water burner cutoff means (not shown) and a high-water alarm (not shown), in the manner which is described in the cited patent.

Because the proportioning valve 200 of FIGURE 9 is of a type which is known to the art, only a brief description thereof will be attempted here. The proportioning valve 200 comprises a housing 201 having therein a chamber 202 which is generally T-shaped in diametrical section. The upper generally horizontal space 202a of the chamber 202 is divided into an upper portion 203 and a lower portion 204 by a fluid-tight flexible diaphragm 205, which is sealed along its entire periphery 206 to the housing 201. Fluid passageway means 207 are provided to the upper chamber portion 203. The diaphragm 205 is sandwiched between a centrally positioned upper rigid disc 208 and a centrally positioned lower rigid disc 209, which are held in place by fluid-tight fastening means 210, which may be of any suitable sort. The fastening means 210 also holds the upper end 211 of a valve stem 212, which extends into the lower generally columnar space 202b of the chamber 202. A coiled spring 213, which is employed around the valve stem 212, bears against the lower rigid disc 209 and against shoulder means 214, which is integrally formed on the housing 201 so as to extend across the lower generally columnar space 202b of the chamber 202. This space 202b has a suitable air vent (not shown). The shoulder means 214 is provided with an axial opening 215 into which is force-fitted a mechanical seal 216 for the valve stem 212. The lower end 217 of the valve stem 212 carries a valve member 218. The valve member 218 is shaped to fit a valve seat 219, which is mounted in the housing 201 around the opening 220 of inlet passageway means 221 into the chamber 202. Outlet passageway means 222 are provided to the chamber 202 between the shoulder means 214 and the valve seat 219. For fluid to pass from the inlet passageway means 221 to the outlet passageway means 222, the valve 200 must be open, that is, the valve member 218 must be withdrawn from the valve seat 219. The spring 213 is effective for biasing the stem 212 such that the valve member 218 is fully withdrawn from the valve seat 219 and such that the diaphragm 205 is flexed upwardly (as shown).

The proportioning valve 200 is fully closed, that is, the valve member 218 is driven fully into the valve seat 219, upon the application of a driving fluid to the upper portion 203 of the chamber 202 through the fluid passageway means 207 so as to cause the diaphragm 205 to be flexed downwardly against the bias imposed by the spring 213 thereby to drive the valve member 218 fully into the valve seat 219. The driving fluid must be applied through the fluid passageway means 207 at or above a certain relatively high pressure to drive the valve member 218 fully into the valve seat 219. At incrementally lesser pressures, the proportioning valve 200 is correspondingly baffled or intermediately opened, and, at or below a certain relatively low pressure, the proportioning valve 200 is fully opened.

In one example of an operation of the valve assembly 200 the float means 29 is associated with the boiler float chamber, as described, and the inlet passageway means 79 of the junction housing 76 of the fluid diversion system 75 is connected to a source (not shown) of driving fluid, preferably air, under a generally constant pressure which is approximately equal to but not less than the pressure at or above which the driving fluid must be applied through the fluid passageway means 207 of the proportioning valve 200 for the proportioning valve 200 to be fully closed. The inlet passageway means 79 of the junction housing 76 is connected to the fluid passageway means 207 of the proportioning valve 200. The proportioning valve 200 is inserted in the feedwater system of the boiler such that feedwater must pass into the inlet passageway means 221 and out of the outlet passageway means 222 before entering the boiler.

When the port means 25 of the valve device 24 is fully closed, as described, that is, when the boiler is in a high-water condition, no driving fluid is diverted by the fluid-diversion system 75 and the driving fluid is applied to the proportioning valve 200 at a pressure which is sufficient to effect full closure thereof and cut off the flow of feedwater to the boiler. When the port means 25 of the valve device 24 is baffled or intermediately opened, as described, a portion of the driving fluid is diverted by the fluid-diversion system 75, and the driving fluid is applied to the valve proportioning 200 at a lesser pressure so as to effect partial closure thereof and permit an intermediate rate of flow of feedwater to the boiler. When the port means 25 is fully opened, as described, that is, when the boiler is in a low-water condition, most of the driving fluid is diverted by the fluid-diversion system 75, and the proportioning valve 200 is relieved so as to effect full opening thereof and permit a maximum rate of flow of feedwater to the boiler.

The rate of feedwater flow into the proportioning valve 200 should be adjusted such that feedwater is permitted to flow to the boiler at a rate which is equal to the rate of consumption of water under normal operation of the boiler. Under these conditions, the proportioning valve 200 is in the baffled or intermediately opened state (FIGURE 7) which reflects to the mean water level in the boiler float chamber, as described. Thus, when the boiler is operating normally, feedwater flows thereto at a rate which is equal to the rate of consumption of water, but, if the boiler is in a high-water condition, the rate of feedwater flow is reduced, and, if the boiler is in a low-water condition, the rate of feedwater flow is increased. It should be noted that, if a driving fluid pressure failure occurs, the proportioning valve 200 becomes fully opened.

The foregoing description pertains to the preferred embodiment of this invention.

In a modified valve assembly embodying the principles of this invention, the electrical switch means 27 may be eliminated, and fluid-driven, diaphragm-actuated electrical switches, of the type which is shown in FIGURE 10, may be utilized in the circuits of a low-water burner cutoff means and a high water alarm.

Because the fluid-driven, diaphragm-actuated electrical switch means 240 of FIGURE 10 may be constructed according to known principles, only a brief description thereof will be attempted here. The electrical switch means 240 comprises a switch housing 241, in which are mounted a first contact electrode 242, a second contact electrode 243, and a spring contact arm 244. The spring contact arm 244 is biased into physical and consequently electrical contact with the first contact electrode 242 and may be deflected into physical and consequently electrical contact with the second contact electrode 243. The electrical switch means 240 further comprises a fluid housing 245, which is fixedly mounted to the switch housing 241. The fluid housing 245 has a chamber 246, which is divided into an upper portion 247 and a lower portion 248 by a fluid-tight flexible diaphragm 249, which is sealed along its entire periphery 250 to the fluid housing 245. A centrally positioned rigid disc 251 is suitably affixed to the diaphragm 249. A plunger 252 is slidably mounted through a mechanical bushing 253, which is mounted in the wall 254 of the housing adjacent to the lower portion 248 of the chamber 246 of the fluid housing 245, between the disc 251 and the spring contact arm 244. The spring contact arm 244 biases the diaphragm 249 to its upwardly flexed condition (as shown).

Fluid passageway means 255 are provided to the upper portion 247 of the chamber 246 of the fluid housing 245. The spring contact arm 244 will be deflected so as to break contact with the first contact electrode 242 and to make contact with the second contact electrode 243, upon the application of driving fluid, preferably air, under a generally constant pressure to the upper portion 247 of the chamber 246 so as to cause the diaphragm 249 to be flexed downwardly against the bias imposed by the spring contact arm 244 through the plunger 252.

Fluid-driven, diaphragm-actuated electrical switch means, of the type which is exemplified by the electrical switch means 240, may be actuated by means of valve devices which are characterized by rotatable valve or closure means. FIGURES 11 and 12 illustrate, in one modified valve assembly embodying the principles of this invention, one type of valve device 270a useful in this application, and FIGURE 13 illustrates, in another modified valve assembly embodying the principles of this invention, another similarly useful type of valve device 270b.

In the valve device 270a of FIGURES 11 and 12, the housing block 135′, the bar magnets 172′ and 174′, the port means 25′, and the generally disc-shaped member 150′ are similar to the housing block 135, the bar magnets 172 and 174, the port means 25, and the generally disc-shaped member 150 of the preferred embodiment. Additional port means 271a and 271b are provided. Each of the additional port means 271a and 271b forms part of a separate fluid-diversion system (not shown), which may be similar to the fluid-diversion system 75 of the preferred embodiment. Each fluid-diversion system may be connected to a separate fluid-driven, diaphragm-actuated electrical switch means (not shown), which may be similar to the electrical switch means 240, and is adapted to apply driving fluid to the electrical switch means. Additional rotatable generally disc-shaped members 272a and 272b, which have respective peripheral stepped cam-like surfaces 273a and 273b, are mounted to the housing block 135′ for conjoint rotation with the bar magnet 172′. The stepped cam-like surface 273a of the generally disc-shaped member 272a has a radially high portion 274a which is effective for closing the port means 271a and thereby actuating the associated electrical switch means by permitting the driving fluid to be applied thereto under full pressure, and a radially reduced portion 275a, which is effective for opening the port means 271a and thereby restoring the electrical switch means by diverting most of the driving fluid therefrom. The stepped cam-like surface 273b of the generally disc-shaped member 272b has a similar radially high portion 274b and a similar radially reduced portion 275b. The positions of the port means 271a and 271b relative to the positions of the respective radially reduced portions 275a and 275b may be arranged such that the opening of the port means 271a and 271b and the consequent actuation of the respective electrical switch means may be related to boiler operating conditions as reflected by the pivotal position of the bar magnet 172'. Accordingly, as shown, the relative positions of the port means 271a and the radially reduced portion 275a of the cam-like surface 273a are arranged such that opening of the port means 271a corresponds to a low-water condition, whereupon the associated electrical switch means may be employed in the circuit of low-water burner cutoff means (not shown). Also, as shown, the relative positions of the port means 271b and the radially reduced portion 275b of the cam-like surface 273b are arranged such that opening of the port means 271b corresponds to a high-water condition, whereupon the associated electrical switch means may be employed in the circuit of a high-water alarm (not shown). So used, these electrical switch means will fail-safe, that is, if a driving fluid pressure failure occurs, the one will actuate the burner cutoff means and the other will actuate the alarm.

In the valve device 270b of FIGURE 13, the bar magnets 172″ and 174″, and the port means 25″ are similar to the bar magnets 172 and 174 and the port means 25 of the preferred embodiment. The rotatable generally disc-shaped member 150″ is similar to the generally disc-shaped member 150 but for an additional peripheral stepped cam-like surface 276, which is circumferentially spaced from the port means 25″. The stepped cam-like surface 276 has a radially high portion 277 and a radially reduced portion 278. Additional port means 279a and 279b are provided. Each of the additional port means 279a and 279b forms part of a separate fluid-diversion system (not shown), which may be similar to the fluid-diversion system 75 of the preferred embodiment. Each fluid-diversion system may be connected to a separate fluid-driven diaphragm-actuated electrical switch means (not shown) which may be similar to the electrical switch means 240, and is adapted to apply driving fluid to the electrical switch means. The port means 279a is positioned relative to the cam-like surface 276 such that the radially high portion 277 of the cam-like surface 276 is effective for closing the port means 279a and thereby actuating the associated electrical switch means by permitting the driving fluid to be applied thereto under full pressure, and such that the radially reduced portion 278 of the cam-like surface 276 is effective for opening the port means 279a and thereby restoring the associated electrical switch means by diverting most of the driving fluid therefrom. The port means 279b is similarly positioned relative to the cam-like surface 276 but is circumferentially spaced from the port means 279b. The relative positions of the port means 278, 279a and 279b and the radially reduced portion of the cam-like surface 276 may be arranged such that opening of the port means 279a and 279b and the consequent actuation of the respective electrical switch means may be related to boiler operating conditions as reflected by the pivotal position of the bar magnet 172″. Accordingly, as shown, the relative positions of the port means 279a and the radially reduced portion 278 of the cam-like surface 276 are arranged such that the opening of the port means 279a corresponds to a low-water condition, whereupon the associated electrical switch means may be employed in the circuit of low-water burner cutoff means (not shown). Also, as shown, the relative positions of the port means 279b and the radially reduced portion 278 of the cam-like surface 276 are arranged such that the opening of the port means 279b corresponds to a high water condition, whereupon the associated electrical switch means may be employed in the circuit of a high water alarm (not shown). So used, these electrical switch means (not shown) will fail-safe, that is, if a driving fluid pressure failure occurs, the one will actuate the burner cutoff means and the other will actuate the alarm.

We claim:

1. In a valve assembly for use with a vessel adapted to confine a first fluid, the combination of port means adapted to emit a second fluid under pressure, closure means for said port means, said closure means including a rotatably mounted generally disc-shaped member having a peripheral cam-like surface, said cam-like surface having a radially high portion effective for closing said port means and a radially reduced portion effective for opening said port means, wherein said generally disc-shaped member comprises a disc having a chordal slot, said chordal slot opening at the periphery of said disc and terminating within the body of said disc, portions of said body of said disc on opposite sides of said chordal slot being drawn together, whereby said radially reduced portion of said cam-like surfaces slope radially inwardly with respect to said radially high portion of said cam-like surface, and means for rotating said generally disc-shaped member in response to fluid displacement within said vessel and thereby controlling the position of said cam-like surface with respect to said port means.

2. The combination of claim 1 wherein said means for rotating said generally disc-shaped member in response to fluid displacement within said vessel comprises a movably mounted first two-pole bar magnet, means for moving said first two-pole bar magnet in response to fluid displacement within said vessel, and a second two-pole bar magnet transversely mounted for conjoint rotation with said generally disc-shaped member and disposed with one pole of said second two-pole bar magnet adjacent to one pole of said first two-pole bar magnet to effect conjoint rotation of said second two-pole bar magnet and said generally disc-shaped member in response to movement of said first two-pole bar magnet.

3. The combination of claim 2, wherein said disc-shaped member further comprises a means for radially adjusting said disc relative to the axial position of said second two-pole bar magnet provide an initial adjustment between said disc-shaped member and said port means.

4. The combination of claim 3, wherein said radial adjustment means comprises a pair of diametrically opposed arcuate slots formed in said disc and pin means inserted through each of said arcuate slots to lock said disc in a fixed relationship with respect to said second two-pole bar magnet.

5. The combination of claim 1, wherein said disc-shaped member includes an adjustable means to vary the distance separating the outer ends of said portions of said body on opposite sides of said chordal slot to thereby provide an adjustment of the curvature between said radially high portion and said radially reduced portion of said cam-like surface.

6. The combination of claim 5, wherein said adjustable means comprises aligned bores formed adjacent to the outer ends of said chordal slot in said portions of said disc in a transverse direction across said chordal slot, a stud member having a threaded portion and unthreaded portion with an annular groove, one of said bores having a threaded receptacle to receive said threaded portion of said screw member, and the other of said bores having a means to revolvably engage said annular groove of said unthreaded portion to hold said stud member against axial movement relative to said other bore.

7. In a valve assembly for use with a vessel adapted to confine a first fluid, the combination of a first port means adapted to emit a second fluid under pressure, a first closure means for said port means, said first closure means including a rotatably mounted generally first disc-shaped member having a peripheral cam-like surface, said cam-like surface having a radially high portion effective for closing said port means and a radially reduced portion effective for opening said port means, with said radially reduced portion of said first cam-like surface being sloped radially inwardly with respect to said radially high portion of said first cam-like surface, a second port means adapted to emit a third fluid under pressure, a second closure means for said second port means, said second closure means including a generally disc-shaped member having a stepped cam-like peripheral surface and being rotatably mounted on a common shaft with said first disc-shaped member, said stepped cam-like surface having a radially high portion for closing said second port means and a radially reduced portion for opening said second port means, and means for rotating said common shaft of said first and second disc-shaped members in response to fluid displacement within said vessel to thereby control the position of said first and second disc-shaped members, respectively, relative to said first and second port means.

8. The combination of claim 7 wherein said first disc-shaped member comprises a disc having a chordal slot, said chordal slot opening at the periphery of said disc and terminating within the body of said disc, portions of said body of said disc on opposite sides of said chordal slot being drawn together.

References Cited

UNITED STATES PATENTS

| | | | |
|---|---|---|---|
| 1,894,367 | 1/1933 | Corcoran | 137—416 X |
| 2,596,366 | 5/1952 | Brockett | 137—413 X |
| 2,718,878 | 9/1955 | Du Bois | 137—82 X |
| 2,752,932 | 7/1956 | Newboult | 137—82 |
| 2,780,242 | 2/1957 | Dyson | 137—82 X |
| 3,088,485 | 5/1963 | Hanssen | 137—413 |
| 3,245,425 | 4/1966 | De Meyer et al. | 137—414 X |

WILLIAM F. O'DEA, Primary Examiner

D. R. MATTHEWS, Assistant Examiner

U.S. Cl. X.R.

137—416, 426